March 25, 1924.
T. F. BUCK
1,487,714
SAFETY FENDER FOR AUTOMOBILES
Filed Oct. 17, 1923   5 Sheets-Sheet 1
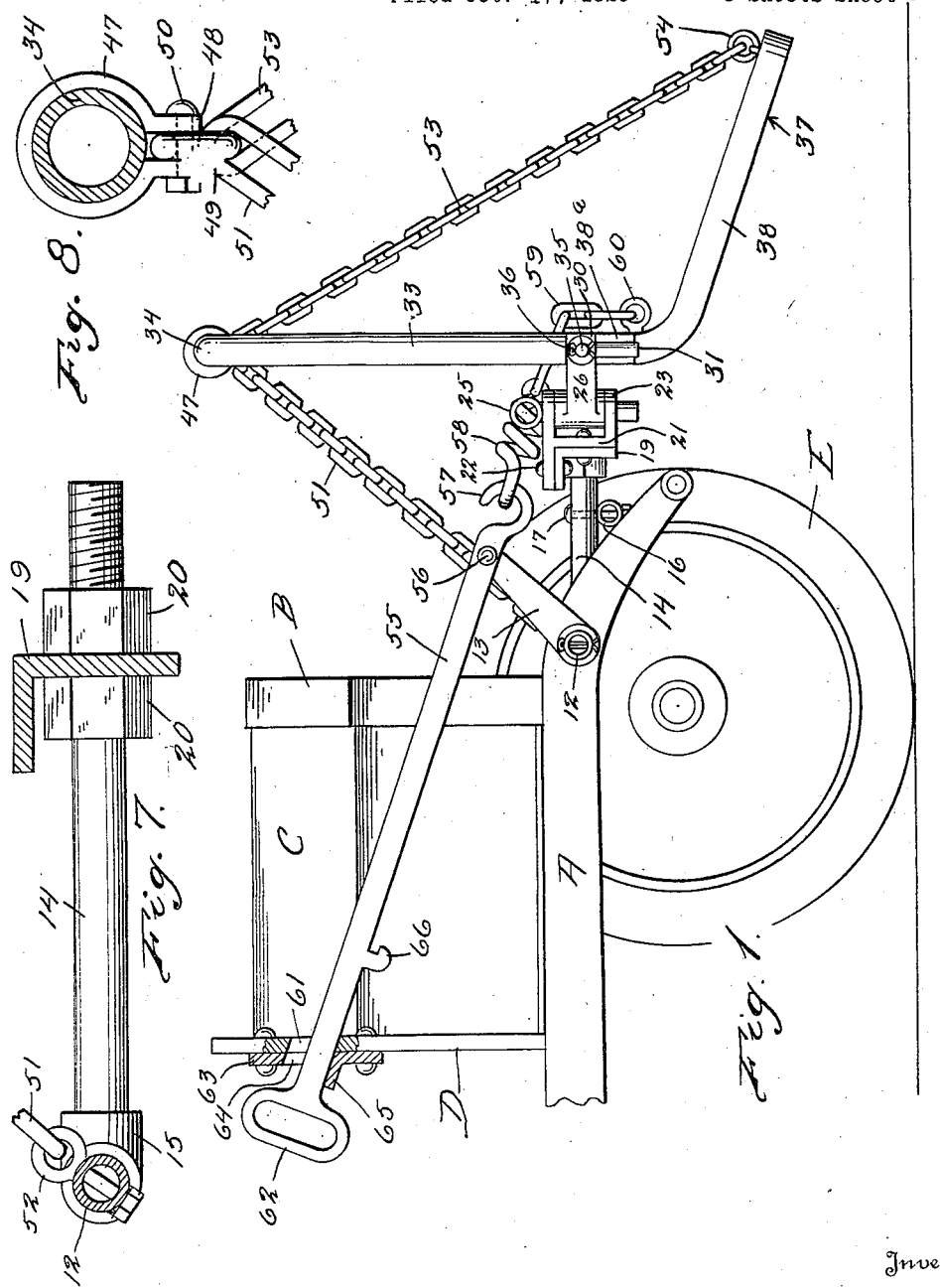
Inventor
Thomas F. Buck
By [signature]
Attorney
Witness
[signature]

March 25, 1924.
T. F. BUCK
SAFETY FENDER FOR AUTOMOBILES
Filed Oct. 17, 1923
1,487,714
5 Sheets-Sheet 2
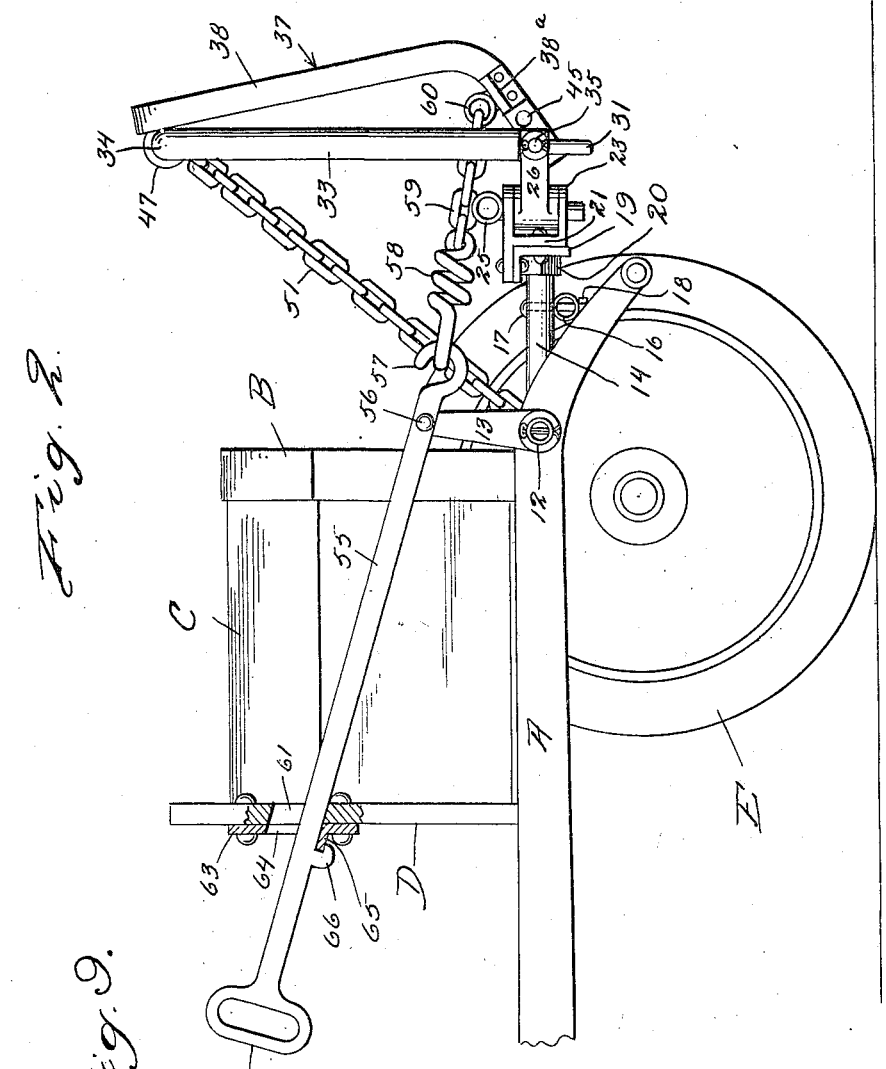
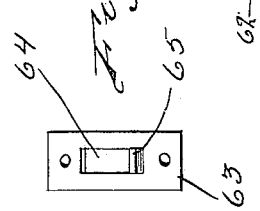
Witness
John Milton Jester
Inventor
Thomas F. Buck
By A. A. Gourick
Attorney

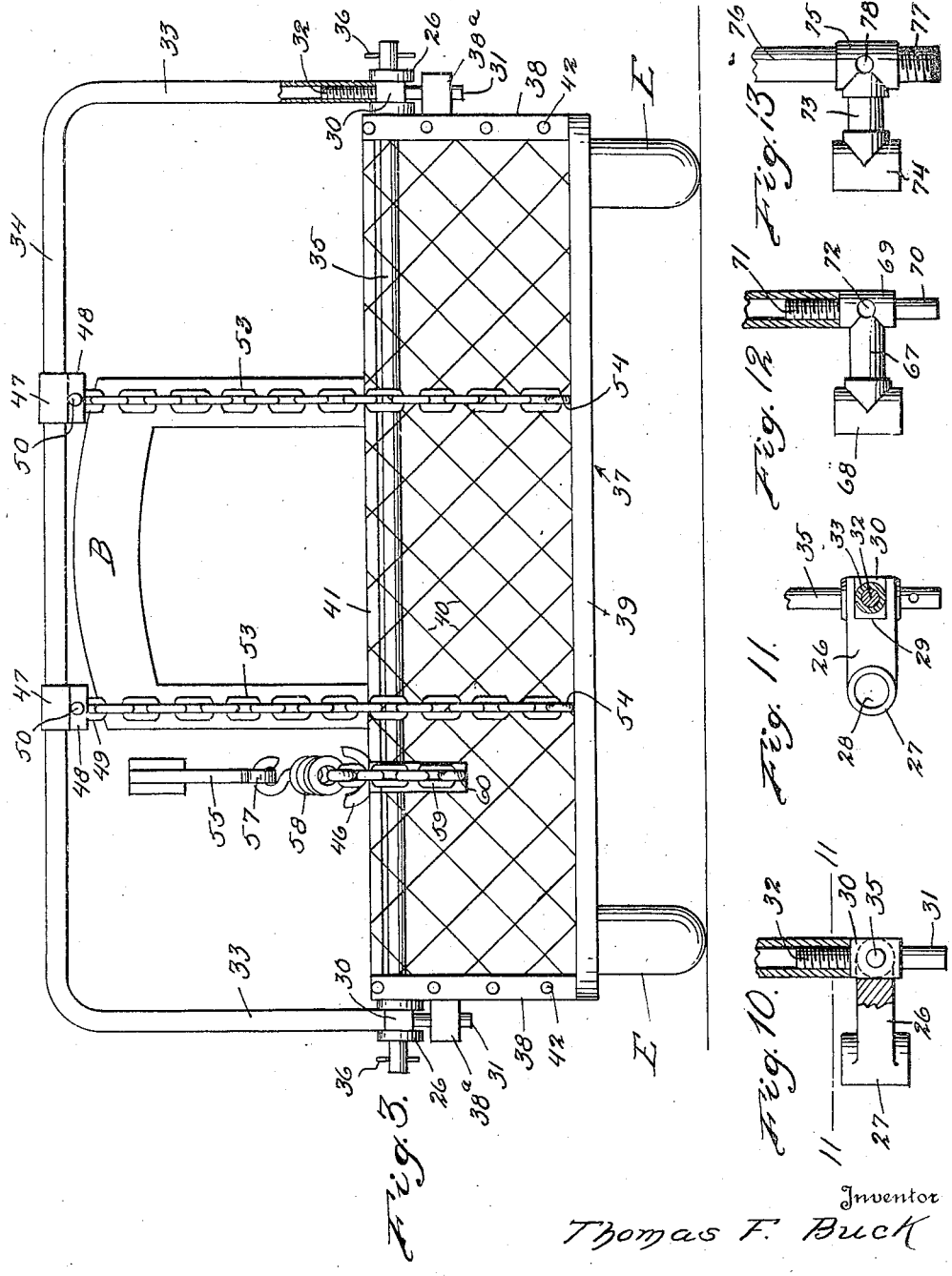

March 25, 1924.
T. F. BUCK
1,487,714
SAFETY FENDER FOR AUTOMOBILES
Filed Oct. 17, 1923    5 Sheets-Sheet 4
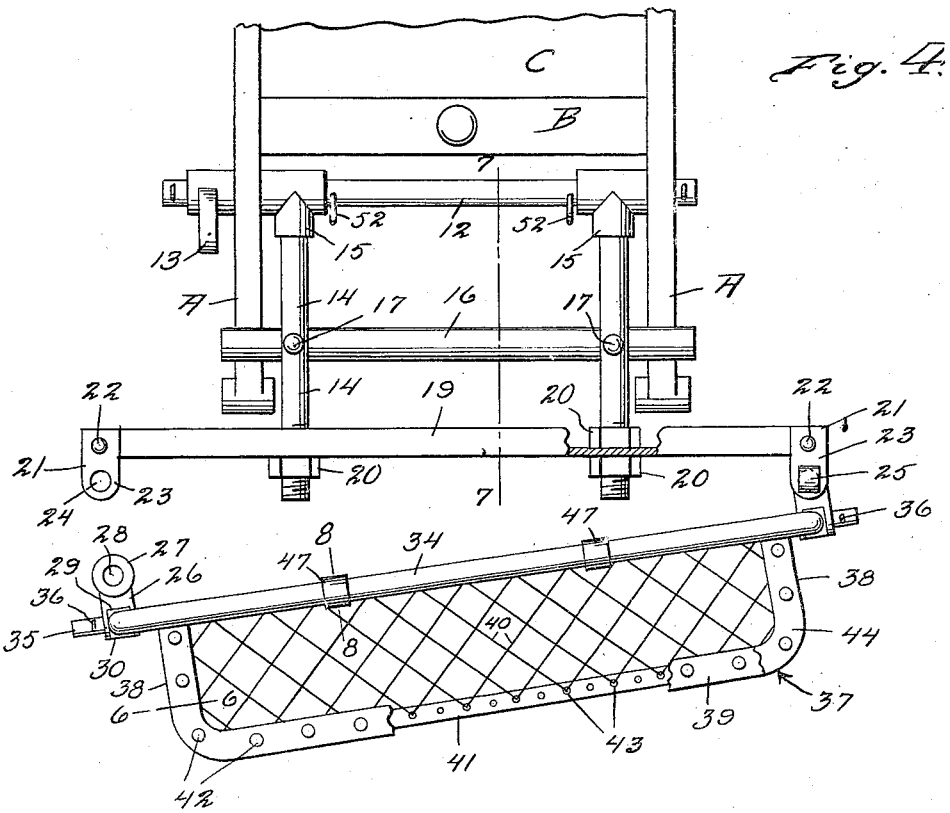
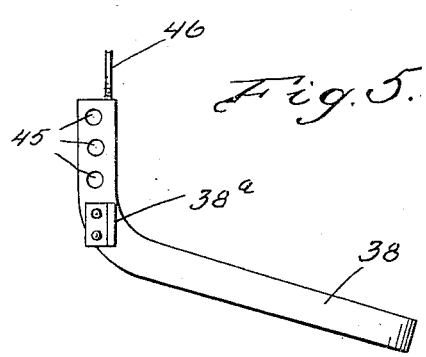
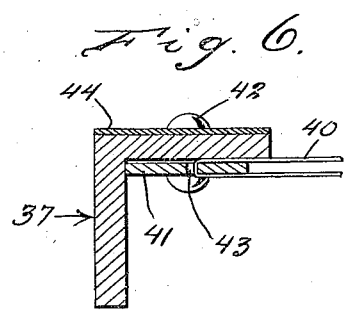
Inventor
Thomas F. Buck
Witness
John Milton Juter
By H. R. Gourick
Attorney

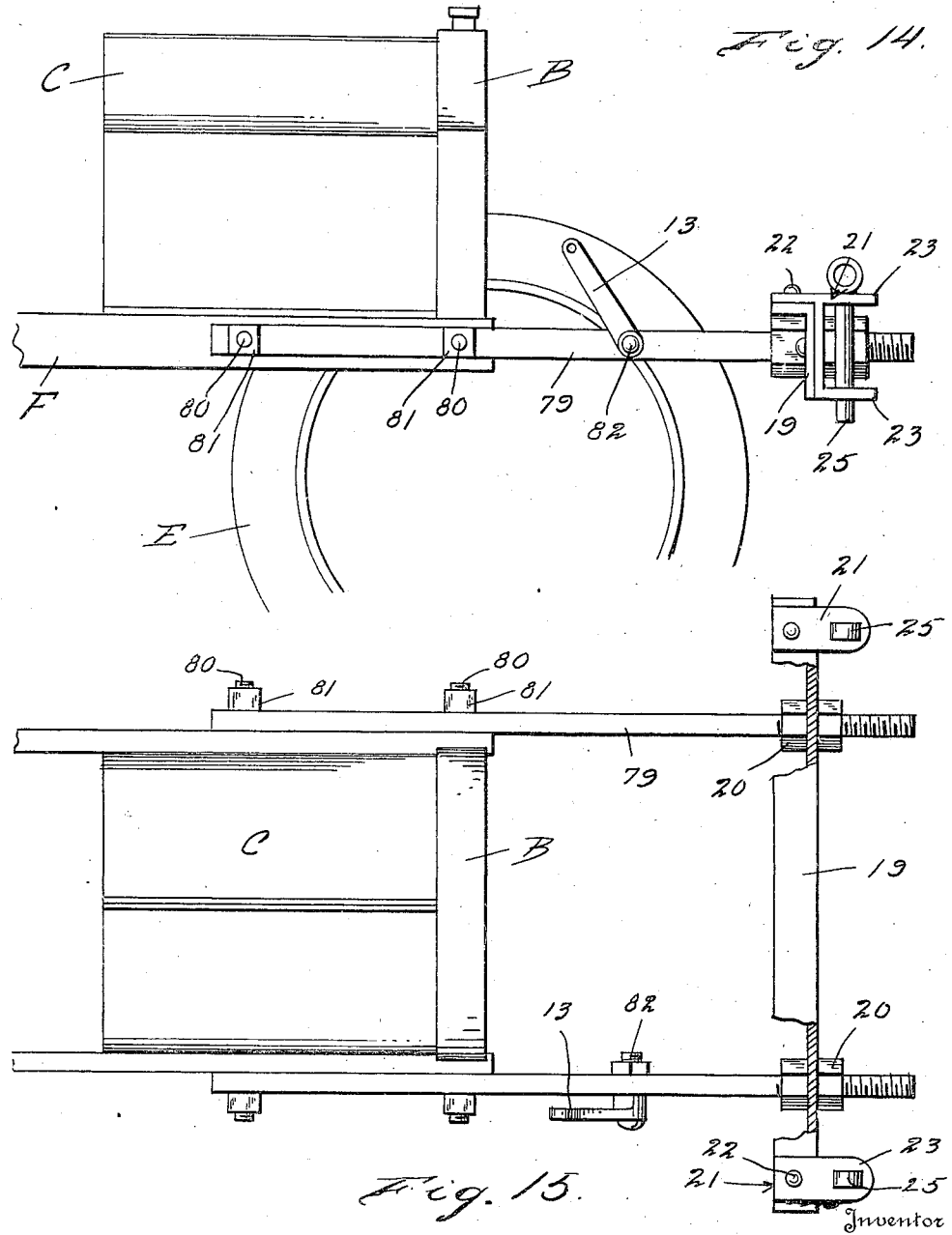

Patented Mar. 25, 1924.

1,487,714

UNITED STATES PATENT OFFICE.

THOMAS F. BUCK, OF NEW CASTLE, PENNSYLVANIA.

SAFETY FENDER FOR AUTOMOBILES.

Application filed October 17, 1923. Serial No. 669,100.

*To all whom it may concern:*

Be it known that I, THOMAS F. BUCK, a citizen of the United States, residing at New Castle, in the county of Lawrence and State of Pennsylvania, have invented certain new and useful Improvements in Safety Fenders for Automobiles, of which the following is a specification.

This invention relates to safety appliances, particularly to safety attachments for automobiles, and has for its object the provision of a novel bumper in association with a fender proper adapted to be mounted upon the front of an automobile whereby to prevent running over pedestrians and to reduce the danger of injury to the front of the car itself in the event of a minor collision.

An important object is the provision of a device of this character in which the fender proper may be raised out of its normal position in case the roads are sufficiently rough and full of obstructions that there might be danger of striking and breaking the fender, lever operated means within ready reach of the driver being provided for the purpose of effecting the raising of the fender into inoperative position.

Another object is the provision of a device of this character in which the fender proper is so mounted that it may be quickly and easily disengaged entirely from its support in case such is desired, and that either side may be disconnected so that the fender proper may be swung to one side or the other out of obstructing relation to the front of the car, so that the operator may gain access to the crank for effecting starting in case the necessity should arise and also in order that access may be had to the radiator in case it is desirable to remove or repair the same.

Yet another object is the provision of a fender structure of this character in which the support is adjustable so that the fender proper may be disposed at different distances in advance of the front of the machine, this feature permitting the use of tires of a larger size than the usual equipment without danger of interference of the fender with the front tires.

An additional object is the provision of a device of this character which will be comparatively simple and inexpensive in manufacture and installation, highly efficient and durable in use, and a general improvement in the art.

With the above and other objects and advantages in view, the invention consists in the combination and arrangement of parts to be hereinafter more fully described and claimed and illustrated in the accompanying drawings in which:

Figure 1 is a side elevation of an automobile equipped with the fender, showing the same in its normal or operative position.

Figure 2 is a similar view showing the fender swung into elevated position.

Figure 3 is a front elevation.

Figure 4 is a plan view showing one end of the fender disconnected and swung, the supporting and operating chains being omitted.

Figure 5 is a detail side elevation of the movable portion of the fender alone.

Figure 6 is a detail cross section on the line 6—6 of Figure 4, showing the fender construction.

Figure 7 is a detail section on the line 7—7 of Figure 4.

Figure 8 is a detail section on the line 8—8 of Figure 4.

Figure 9 is a detail face view of the latch plate carried by the dash.

Figure 10 is a side elevation of the hand rail support, parts being in section.

Figure 11 is a cross section on the line 11—11 of Figure 10.

Figure 12 is a side elevation partly in section showing a modified support for the hand rail.

Figure 13 is an elevation of another modification.

Figure 14 is a side elevation of the fender structure applied to a chassis of different form.

Figure 15 is a plan view thereof.

Referring more particularly to the drawings, the letter A designates the frame bars of an automobile chassis, B represents the radiator, C the hood, D the dash, and E the front wheels. In carrying out my invention I provide a transverse shaft 12 which extends through holes formed in the forwardly projecting ends of the frame bars A, which shaft is equipped at one end with a rotatably mounted crank arm 13 for a purpose to be described.

Carried by the shaft 12 near the inner sides of the frame bars A are arms 14 which might in actual practice be pipe sections and which are mounted at one end and screwed into T's 15 which are secured upon the shaft. The threaded ends of the arms 14 are screwed tightly against the shaft 12 so as to prevent subsequent accidental displacement, a locking action occurring. Located between the T's 15 and the forward extremities of the arms 14 is a transverse tubular bar 16 which is located beneath the arms 14 and above the forward ends of the frame bars A. This tubular member is held by bolts 17 equipped with nuts 18. This member 16 acts as a stop for preventing dropping of the arms 14 in case of failure of an additional holding means to be described. The forward ends of the arms 14 are threaded and passed through an angle bar 19 which projects laterally beyond the frame bars A to a considerable extent and which is adjustable with respect to the arms 14 by virtue of nuts 20 which are threaded onto the arms and which engage against the forward and rear sides of the bar 19.

The adjustability of the bar 19 which carries the fender structure proper to be described, is an important feature as it permits the bar to be moved into different positions depending upon the size of the wheels of the car or depending upon whether or not oversize tires are used. All necessary adjustment is readily effected by turning the nuts properly.

Secured upon the ends of the bar 19 are hinge members 21 held thereto by suitable rivets 22 or the like. These hinge members are of a bracket-like formation and include spaced upper and lower arms 23 formed with registering holes 24 for the reception of removable pivot pins 25 which have their upper ends formed as handles or loops. The hinge structure further includes a bracket-like member 26 associated with each of the bracket or hinge members 21 and having a hub portion 27 received between the upper and lower elements 23, the hub member having a hole 28 for the reception or passage of the removable pivot pin. The free ends of the members 26 are bifurcated at 29 and engaged thereunder are block-like members 30 formed with depending stubs 31 and upwardly extending threaded stubs 32 which are screwed into the lower ends of the vertical arms 33 of a hand rail structure 34. Extending entirely across the front of the vehicle is a pivot shaft 35 which has its ends passing through transverse holes in the member 30, accidental retraction being prevented by cotter pins 36 or the like. The passage of this pivot shaft through these members 30 and through the opposite sides of the bifurcations 29 holds the members 30 associated with the members 26.

The fender proper comprises a frame 36 of angle iron including side bars 38 which have their lower portions curved forwardly and downwardly and connected by a preferably integral cross bar 39. This frame is covered by wire mesh indicated at 40 and it is of course apparent that the exact manner of connecting the wires of the mesh with the frame may be varied within comparatively wide limits. For the sake of illustration, however, I have shown an inner frame 41 located against the inside of the angle iron bars forming the frame 37 and secured thereto by rivets 42 or the like. The inner frame is preferably formed with holes 43 through which pass the wires forming the screen or mesh. While it is not essential, it is preferable that the top at least of the frame 37 be covered with rubber, as indicated at 44, for reducing danger of injury to a person struck by or falling upon the fender. The sides 38 of the main frame 37 are each formed with a plurality of holes 45 through selected ones of which may be passed the pivot shaft 35. Obviously, if the shaft be engaged through the uppermost holes 45 the fender will be held nearer to the ground than if the shaft be engaged through the intermediate or lower holes. Riveted or otherwise secured upon the sides 38 of the frame 37 are angular brackets 38$^a$ which abut against the stubs 31 for the purpose of limiting the downward movement of the above described fender proper with respect to its supports. Suitably fastened to the wire mesh and inner frame is a bracket 46 which projects upwardly beyond the fender proper for a purpose to be described.

In order that the fender proper may be used for carrying luggage or as a platform upon which a person may stand, and in order to hold it firmly and prevent it from breaking down from such weight, or from the weight of a person struck and falling upon it, it is necessary to provide brace means. To accomplish this I mount upon the hand rail 34 collars 47 which are spaced apart, as shown in Figures 3 and 4, and which terminate in ears 48 between which is located a ring 49 held by a bolt 50. Engaged with the rings are chains 51 which extend in a rearward and inclined direction and which have their other ends connected with eye bolts 52 secured to the member 12. Also connected with the rings 49 are downwardly and forwardly inclined chains 53 which have their lower ends connected with rings 54 carried by the frame 37.

Ordinarily, that is when the use of the fender is desired, the parts are disposed as shown in Figure 1, the forward edge of the fender proper approaching the ground comparatively closely. When passing over rough or stony roads wherein the obstructions are sufficiently high that the fender might be struck and damaged, it is advisable that means be provided for lifting the fender.

In carrying out this feature, I provide an elongated lever 55 which is pivotally connected at 56 with the arm 13 and which terminates in a hook 57 engaged with one end of a coil spring 58 to which is connected a chain 59 trained over the bracket arm 46 and connected with a ring 60 at the lower end thereof. The lever 55 is slidable through a slot 61 in the dash D and its rear end is equipped with a loop-like handle 62. On the face of the dash is a keeper plate 63 formed with a slot 64 registering with the slot 61 and also formed with a retaining lip or flange 65 with which may be engaged a lug 66 projecting from the underside of the lever. By this means it will be seen that when passing over a rough road the operator may grasp the handle 62 and pull upon the lever 55 whereupon the tension exerted on the spring 59 bearing on the bracket arm 46 will operate to swing the fender proper into elevated position, as shown in Figure 2, so that there will be no danger of its striking against any stones or other obstructions. The lug 66 operates to hold the lever in its rearmost position so that the fender proper cannot accidentally descend to its normal position.

It is quite apparent that the hinge structure comprised by the parts 26 to 32, inclusive, might be varied and in Figures 12 and 13 I have shown alternate structures. In Figure 12 there is illustrated a T-shaped member 67 replacing the element 26 above described and connected at one end with a T 68 corresponding to the hub 27 and designed to be engaged between the upper and lower plate elements 23 of the hinge structure 21. This T-shaped member 67 has its other end terminating in a head 69 from the lower end of which projects a stub 70 corresponding to the stub 31 and for the same purpose, and from the top of which projects a threaded stub 71 corresponding to the stub 32 and which is screwed into the hand rail. The head 69 has a hole 72 for the passage of the pivot shaft 35.

In Figure 13 I have shown a pipe section 73 carrying at one end a T 74 corresponding to the hub 27, and carrying at its other end a T 75 which is screwed onto the threaded lower end of the hand rail, indicated at 76. The lower end of the hand rail projects considerably beyond the T 75 to define an extension 77 which corresponds to the stub 31 or stub 70. The T 75 is formed with a hole 78 for the passage of the pivot shaft 35.

All of the above described structure is shown as mounted upon an automobile chassis of that type in which the frame bars project considerably beyond the front of the radiator. There are, however, other types of cars, notably the Ford, in which the frame bars terminate at the radiator. In adapting my fender structure for use upon this type of vehicle, I employ elongated bars 79 which replace the arms 14 above described and which are disposed against the outer sides of the frame bars F and secured thereto by bolts 80 carrying nuts 81, the bolts being introduced from the inner sides of the frame bars F. The outer ends of the bars 79 carry the same angle bar 19 as above described and the same adjusting nuts and all the other features are exactly the same except that the transverse member 16 and shaft 12 are omitted, the rocker arm 13 being pivoted upon one of the bars 79 by a bolt 82. In every other respect the construction and operation of this form are exactly the same as in the first described form.

The normal or operative position is shown in Figure 1, and the inoperative or elevated position is shown equally clearly in Figure 2 and the operation of moving the fender proper from one position to the other has been explained. There is still another feature of advantage and that is that by removing both of the pivot pins 25 and angling the various chains, the fender proper may be disengaged from the arms 14 and hinge member 21 entirely in case any necessity for such action should arise. Instead of removing the fender proper bodily, it is easily possible to remove either of the pivot pins 25 and after disconnecting the chains swing the fender proper upon the other pivot bolt, as indicated in Figure 4, so that access may be had to the front of the car for cranking in case of failure of the usual electric starter, or for making any repairs to or removing the radiator.

From the foregoing description and a study of the drawings it will be apparent that I have thus provided a simply constructed, comparatively inexpensive and easily installed and controlled fender device which will be a great safe-guard to the public inasmuch as it will prevent persons struck from being run over as they will be caught by the fender and carried along until the car can be brought to a standstill Furthermore, the device will operate to prevent serious injury to the car itself in case of a minor collision so that the device is bound to be of benefit when considered from any angle.

While I have shown and described the preferred embodiment of my invention, it is of course to be understood that I reserve the right to make such changes in the form, construction and arrangement of parts as will not depart from the spirit of the invention or the scope of the subjoined claims.

Having thus described my invention, I claim:

1. A safety fender for automobiles comprising a pair of arms secured upon the forward ends of the side bars of the automobile frame, a transverse member extending through said arms, a pair of arms rotatably mounted upon said transverse member and connected by a cross-bar normally resting upon the first named arms, a bar carried by the forward ends of the second named arms, U-shaped hinge elements carried by the ends of said bar, forwardly extending members engaged within said U-shaped hinge elements and removably held by pintle pins, an inverted U-shaped hand-rail connected with said last named members, a shaft extending through said last named members, a fender carried by the shaft, and means for swinging the fender vertically.

2. In a fender structure, forwardly extending arms, a cross bar connecting the same, hinge members on the ends of the bar including upper and lower ears, other hinge members including hub portions detachably connected with said ears, the second named hinge members being bifurcated, block-like elements located within the bifurcations, upstanding stubs carried by said elements, a fender proper, and a shaft carrying the fender proper and extending through said elements.

3. In a fender device, forwardly extending arms, a cross bar connecting the same, hinge members at the ends of said bar, other hinge members detachably connected with the first named hinge members and formed with bifurcations, elements engaged within the bifurcations, threaded stubs projecting upwardly from the elements, a shaft passing through said elements and bifurcations, a fender proper suspended from said shaft, and a hand rail having depending ends screwed upon said stubs.

4. In a fender structure, forwardly extending arms, a cross bar connecting the same, hinge members on the ends of said bar, other hinge members detachably connected with the first named hinge members, elements engaged within the second named hinge members and provided with upstanding stubs, a shaft passing through said elements and second named hinge members, a fender proper suspended from said shaft, and a hand rail detachably connected with said stubs.

5. In a fender structure, forwardly extending arms, a cross bar connecting the same, hinge members on the ends of said bar, other hinge members detachably connected with the first named hinge members, elements engaged within the second named hinge members, and provided with upstanding stubs, a shaft passing through said elements and second named hinge members, a fender proper suspended from said shaft, a hand rail detachably connected with said stubs, means for swinging the fender, stubs depending from said elements, and stop brackets on the fender proper engageable with the last named stubs for limiting movement in one direction.

6. In combination with the frame bars of a vehicle, forwardly extending arms, means for attaching the same to the frame bars, a cross bar connecting said arms, a fender proper pivotally supported from the cross bar, a hand rail of inverted U-shape supported from said cross bar, chains stationarily mounted at one end rearwardly of the hand rail and connected at their other ends with the hand rail, and other chains connected with the hand rail and with the forward portion of the fender proper.

7. In a fender device, forwardly extending arms adapted to be mounted at the forward ends of the frame bars of an automobile, a cross bar connecting said arms, a fender proper pivotally mounted for vertical swinging movement and detachably connected with said cross bar, a bracket carried by the fender proper and projecting above the top thereof, a chain connected with the lower end of said bracket and trained over the upper end thereof, and a shifting lever extending through the vehicle dash and connected with said chain for swinging said fender proper.

8. In a fender device, forwardly extending arms adapted to be mounted at the forward ends of the frame bars of an automobile, a cross bar connecting said arms, a fender proper pivotally mounted for vertical swinging movement and detachably connected with said cross bar, a bracket carried by the fender proper and projecting above the top thereof, a chain connected with the lower end of said bracket and trained over the upper end thereof, a shifting lever extending through the vehicle dash and connected with said chain for swinging said fender proper, a crank pivoted on one arm and upon which said lever is pivoted, a spring interposed between the lever and the chain, and means for limiting downward movement of the fender proper.

9. A safety fender for automobiles comprising a pair of arms secured upon the forward ends of the side bars of the automobile frame, a transverse member extending through said arms, a pair of arms rotatably mounted upon said transverse member connected by a cross-bar normally resting upon the first named arms, a bar carried by the forward ends of the second named arms, U-shaped hinge elements carried by the ends of said bar, forwardly extending members engaged within said U-shaped hinge elements and removably held by pintle pins, an inverted U-shaped hand-rail connected with said last named members, a shaft extending through said last named members, a fender carried by the shaft, means for swinging the fender vertically, depending stops carried by said last named members, and brackets on the sides of the fender engageable with said stops for limiting downward swinging movement of the fender.

10. In a fender device, forwardly extending arms adapted to be mounted at the forward ends of the frame bars of an automobile, pivoted arms supported from said first named arms, a bar connecting the pivoted arms, U-shaped hinge elements carried by the bar, other hinge elements located within said first named hinge elements, removable pintles connecting the respective hinge elements, a shaft passing through the second named hinge elements, a fender carried by the shaft, an upstanding guard-rail carried by the second named hinge elements, means for swinging the fender vertically, means for limiting downward movement thereof, and means for limiting downward swinging of the pivoted arms.

In testimony whereof I affix my signature.

THOMAS F. BUCK.